United States Patent [19]

Keller et al.

[11] Patent Number: 5,423,410
[45] Date of Patent: Jun. 13, 1995

[54] CONVEYING DEVICE FOR VERTICALLY POSITIONING CAN BODIES

[75] Inventors: Matthias J. M. Keller, Herten; Norbert Lentz, Essen; Guenter Zielke, Schermbeck, all of Germany

[73] Assignee: Krupp Maschinentechnik GmbH, Essen, Germany

[21] Appl. No.: 230,924

[22] Filed: Apr. 21, 1994

[30] Foreign Application Priority Data

May 3, 1993 [DE] Germany .................. 43 14 462.4

[51] Int. Cl.⁶ .............................................. B65G 47/24
[52] U.S. Cl. ................... 198/406; 198/690.1; 198/438
[58] Field of Search ............... 198/406, 436, 438, 439, 198/690.1

[56] References Cited

U.S. PATENT DOCUMENTS

| | | | |
|---|---|---|---|
| 1,243,566 | 10/1917 | Souder | 198/406 X |
| 1,510,096 | 9/1934 | Miller | 198/406 |
| 1,881,187 | 4/1928 | Hermani | |
| 2,671,568 | 3/1954 | Rundt | 198/406 X |
| 2,775,334 | 12/1956 | Jeremiah | 198/406 X |
| 3,433,343 | 3/1969 | Giulie | |
| 3,687,258 | 8/1972 | Wolzak | 198/690.1 X |
| 4,315,568 | 2/1982 | Mojden | 198/690 |
| 4,321,994 | 3/1982 | Heuft | 198/438 X |
| 4,325,476 | 4/1982 | Eddy | 198/448 |
| 4,593,805 | 6/1986 | Huddle | 198/690.1 X |
| 5,029,694 | 7/1991 | Gomez | 198/408 |
| 5,060,840 | 10/1991 | Lentz et al. | 228/47 |
| 5,061,141 | 10/1991 | Lentz et al. | 413/72 |
| 5,158,169 | 10/1992 | Hardman | 198/690 |
| 5,224,585 | 6/1993 | Blanco et al. | 198/690.1 X |

FOREIGN PATENT DOCUMENTS

| | | |
|---|---|---|
| 0121106 | 3/1984 | European Pat. Off. |
| 0420018A3 | 9/1990 | European Pat. Off. |
| 0395178 | 10/1990 | European Pat. Off. |
| 0462497A1 | 6/1991 | European Pat. Off. |
| 0504442A1 | 9/1992 | European Pat. Off. |
| 547218 | 4/1972 | France |
| 2045425 | 3/1971 | Germany |
| 2852741 | 6/1979 | Germany |
| 2656956 | 10/1980 | Germany |
| 3427379A1 | 1/1986 | Germany |
| 3417157C2 | 6/1986 | Germany |
| 3626244A1 | 2/1988 | Germany |
| 2916866C2 | 7/1988 | Germany |
| 3822603A1 | 2/1989 | Germany |
| 3810611A1 | 10/1989 | Germany |
| 9207724 U | 10/1992 | Germany |
| 1352215 | 5/1974 | United Kingdom |
| 2213120 | 8/1989 | United Kingdom |
| WO88/07968 | 10/1988 | WIPO |

OTHER PUBLICATIONS

BBC Handbook for Electromotors, Essen: Giradet 1968; pp. 344–350.
Miller, Lee D.: Ways to Change Direction of Conveyed Materials. In: Automation, Sep. 1965, pp. 102–112.

Primary Examiner—James R. Bidwell
Attorney, Agent, or Firm—Spencer, Frank & Schneider

[57] ABSTRACT

A conveying device is provided for vertically positioning ferromagnetic cans discharged from an upstream unit in a horizontal position. The conveying device includes a first direction changing band for receiving and transporting horizontally disposed ferromagnetic cans discharged from the upstream unit and having a first discharge end for discharging cans in an essentially vertical orientation. A second direction changing band is disposed along side the first direction changing band for transporting cans and has a second discharge end for discharging cans in an essentially vertical orientation. A transfer device transfers a portion of the horizontally disposed ferromagnetic cans to the second direction changing band. An upright can carrying band is disposed beneath the first and second discharge ends of the first and second direction changing bands for receiving the essentially vertically oriented cans.

14 Claims, 4 Drawing Sheets

CONVEYING DEVICE FOR VERTICALLY POSITIONING CAN BODIES

BACKGROUND OF THE INVENTION

The invention relates to a conveying device comprising a direction changing band for vertically positioning ferromagnetic can bodies (hereinafter referred to as cans) which are discharged from a unit in a horizontal position onto an upright can carrying band.

During welding of their longitudinal seam, rounded can bodies are "horizontally" guided past a welding unit, i.e., their axis is horizontally aligned with the direction of transport as disclosed in, for example, European Application No. EP-A2-0,420,018. Accordingly, the welded can body leaves the drying path of the welding machine horizontally on a transport unit.

To feed the can bodies into processing units, such as edge-forming machines, they are usually fed upright, i.e., with their longitudinal axis vertically aligned. Accordingly, these can bodies must be transferred from a horizontal to an upright position.

It is known how to convey can bodies to a transfer and direction changing band which, because it operated at a greater rotational speed in relation to the forward speed of the feeding unit, is often referred to in the prior art as an acceleration band. Due to the increased speed, the cans on the acceleration band are spaced at a greater distance from one another. From the acceleration band, the cans are discharged to a further band, a so-called upright can carrying band. The upper band portion of the acceleration band runs over a large direction changing wheel. The direction of transport, and consequently, the axis of the cans is thus deflected downwardly by 45° to 90°.

The transfer or further transport of the cans by means of the upright can carrying band occurs in relation to the discharging portion of the acceleration band essentially at less than 90°, i.e., the upper portion of the upright can carrying band is correspondingly inclined in the transfer region at an angle up to 45°. The upper band portion of the upright can carrying band thus inclined is guided around a direction changing roll and changed to a horizontal orientation upon reaching a desired height so that the cans are in a vertical position during their transfer to a processing unit.

In order for the cans to be moved from the acceleration band to the upright can carrying band, the mutual distance of the cans on the acceleration band and, correspondingly, the rotational speed of the acceleration band must be sufficiently high. At welding speeds of 1.7 m/s, the rotational speed of the acceleration band would have to be up to 3.3 m/s, depending on the length of the can bodies. However, if the cans are long, speeds like this result in significant problems. With a certain length of can bodies, the high rotational speed results in the cans being lifted off the acceleration band due to centrifugal forces exerted during direction changing, especially since the outer surface of the can bodies theoretically contacts the direction changing wheel at the belt band only at one point. Furthermore, the high impact speed can cause damage to the edges of the open can bodies, and the sharp edges can also cause extensive wear of the receiving upright can carrying band. Moreover, the safety of the cans, especially in an inclined position during transfer by the upright can carrying band is also jeopardized due to gravitational and acceleration forces.

SUMMARY OF THE INVENTION

It is an object of the invention to correct the foregoing drawbacks and to improve on a conveying device as described above for vertically positioning cans such that a safe transfer of cans is possible, even at high feeding speeds, i.e., high output in terms of cans per minute.

The above and other objects are accomplished according to the invention by the provision of a conveying device for vertically positioning ferromagnetic cans discharged in a horizontal position from a unit upstream of the conveying device, comprising: a first direction changing band for receiving and transporting horizontally disposed ferromagnetic cans discharged from the upstream unit and having a first discharge end for discharging cans in an essentially vertical orientation; a second direction changing band disposed along side the first direction changing band for receiving and transporting horizontally disposed ferromagnetic cans and having a second discharge end for discharging cans in an essentially vertical orientation; a transfer device located for transferring a portion of the horizontally disposed ferromagnetic cans discharged from the upstream unit to the second direction changing band so that the first direction changing band transports a remaining portion of the ferromagnetic cans; and an upright can carrying band disposed beneath the first and second discharge ends of the first and second direction changing bands for receiving and transporting the essentially vertically oriented cans.

Preferably, every other can of the cans arriving from the upstream unit is transferred by the transfer device to the second direction changing band. As a result, the distance between every two cans with respect to the arriving row of cans on each of the two direction changing bands, which are moving at the same speed, increases by at least one can length. Each of the two direction changing bands can thus run significantly slower than one single band. The impact speed of the cans on the upright can carrying band is reduced correspondingly so that lifting or falling of the cans during direction changing and damage of the cans upon impact, as well as wear of the upright can carrying band, my be avoided or significantly reduced.

The fact that the direction changing band must discharge the cans in two rows to the upright can carrying band also has a wear-reducing effect on the upright can carrying band so that the load on the upright can carrying band per unit area is additionally reduced.

In a preferred embodiment of the invention the transfer device is provided with air nozzles which are aligned transversely to the direction of transport of the direction changing bands. The nozzles are opened for every other can as a function of the clock rate of the arriving row of cans. The transfer device may alternatively be provided with a press which moves transversely in relation to the direction changing bands to ensure a smooth transfer sequence.

In order to precisely control the release of the transfer device, a switch for sensing the arriving cans is provided.

At the side facing away from the transfer device, the direction changing band is equipped with a limitation device, i.e., a catchment wall or limitation guide, so that the ,cans can be safely kept on the band.

The upper band portion of the direction changing bands is supported in a known manner by magnets to keep the cans pulled to the band. The magnetic field of the band from which the cans are transferred to the second direction changing band may be reduced in the region of the transfer device. This may be accomplished by reducing the density of the magnetic support in relation to the surface unit or by controlling the magnetic adhesion by means of an electromagnet which is turned off, or at least throttled if the transfer device is released.

Means for synchronizing the speed of the two direction changing bands may be provided to ensure the orderly transfer of the cans from the direction changing bands to the upright can carrying band.

In another preferred embodiment, one of the direction changing bands is parallel to the unit which transports the incoming cans in the region of the transfer device and extends over a distance which corresponds at least to the greatest length of a can to be transported by the conveying device. In accordance with the invention, neither of the direction changing bands, nor even a portion of one of such bands, must accommodate the entire incoming stream of cans, due to the division of the incoming stream of cans. This results in a significant increase in the distance between the individual cans on the respective direction changing bands which thus enables the direction changing bands to run even slower than the speed of the upstream conveying unit transporting the incoming cans.

In order to compensate for the loss of height caused by direction changing bands in changing the orientation of the cans from a horizontal position to a vertical position, the angle between the receiving portion of the upright can carrying band with respect to a horizontal line and the angle between the discharge direction of the direction changing bands, and/or an extension guide at the discharge end, with respect to a vertical line, are in a range of from about 5° to about 45°, and preferably in a range from about 8° to about 18°.

In order to ensure a safe transfer of the cans to the upright can carrying band, it is further provided that the angle between the discharge direction of the direction changing bands and/or of an extension guide at the discharge end of the direction changing bands, and of the adjacent portion of the upright can carrying band, which lies in the direction of transport, is set between about 80° and about 89°, and preferably between about 85° to about 88°. In this case, the cans impact first with their forward edge of the rim, seen in the transport direction of the upright can carrying band. Viewed from the side, there is an angle between the rim of the can and the upright can carrying band of about 1° to about 10°, and preferably between about 2° to about 5°, which is open toward the back of the can (in the transport direction). If the can is grasped by means of the upright can carrying band, it can swing back at this angle and can stand squarely on the upright can carrying band. Further tilting is prevented due to the extension guides which are closed in the back.

In order to limit the total length of the conveying device, the upright can carrying band, as seen from the top, is preferably arranged at right angles from the direction changing bands. In order to ensure a smooth outgoing transport of the cans on the upright can carrying band, the discharge ends of the direction changing bands and/or the guides leading away from them are offset in a transverse direction to the conveying direction of the upright can carrying band, with the offset corresponding at least to the greatest diameter of the cans. In order to ensure a smooth transfer to the second direction changing band, a metal transfer plate is further provided in the region of the transfer device. This plate is arranged beneath and between the upper band portions of the second direction changing band and the band transporting the entire stream of cans from the upstream unit, at least over a portion of the band length.

Embodiments of the invention are illustrated in the accompanying drawings.

DESCRIPTION OF THE PREFERRED EMBODIMENTS

Figure 1:
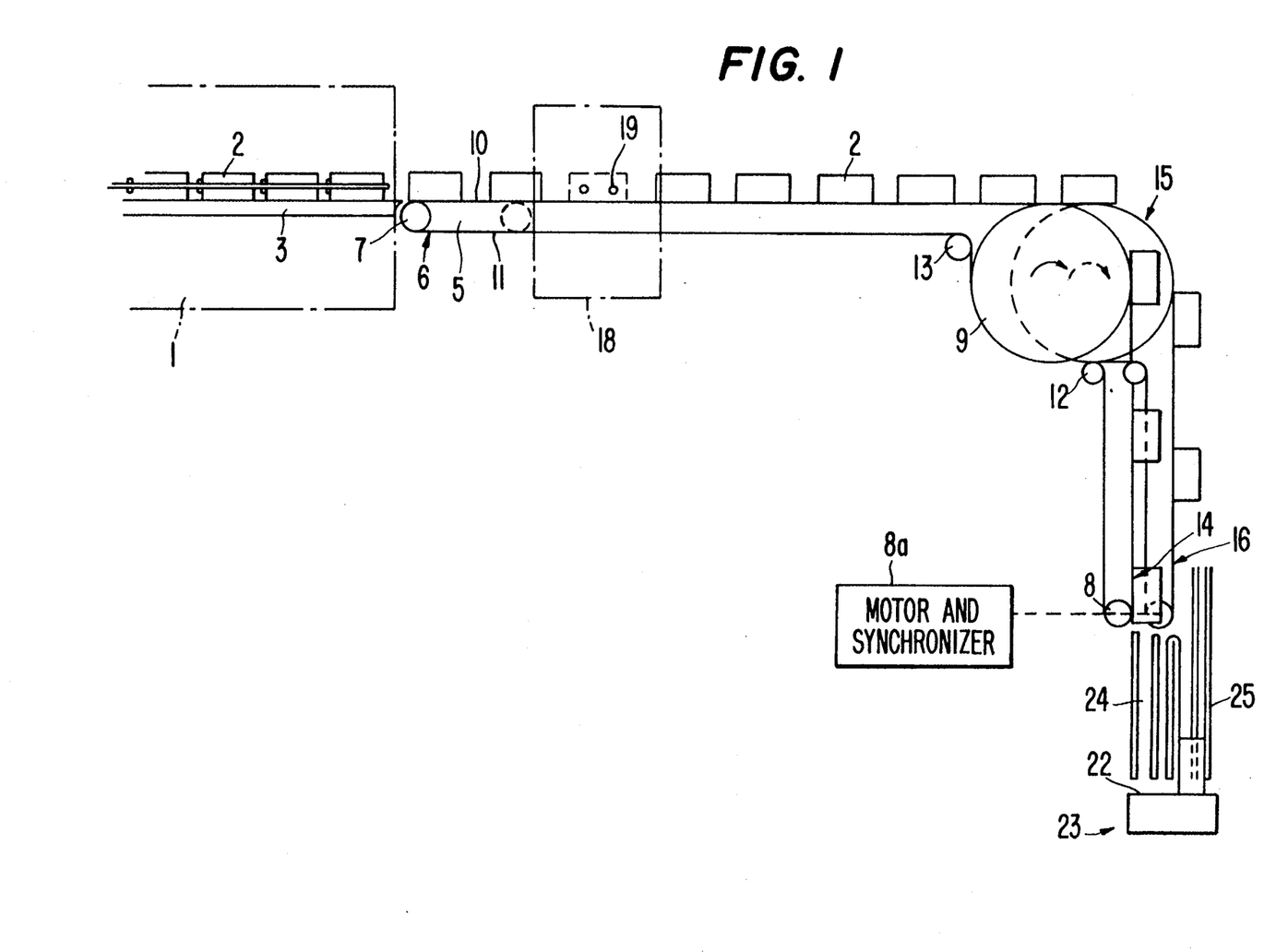
FIG. 1 is a side view of one embodiment of a conveying device according to the invention.
Figure 2:
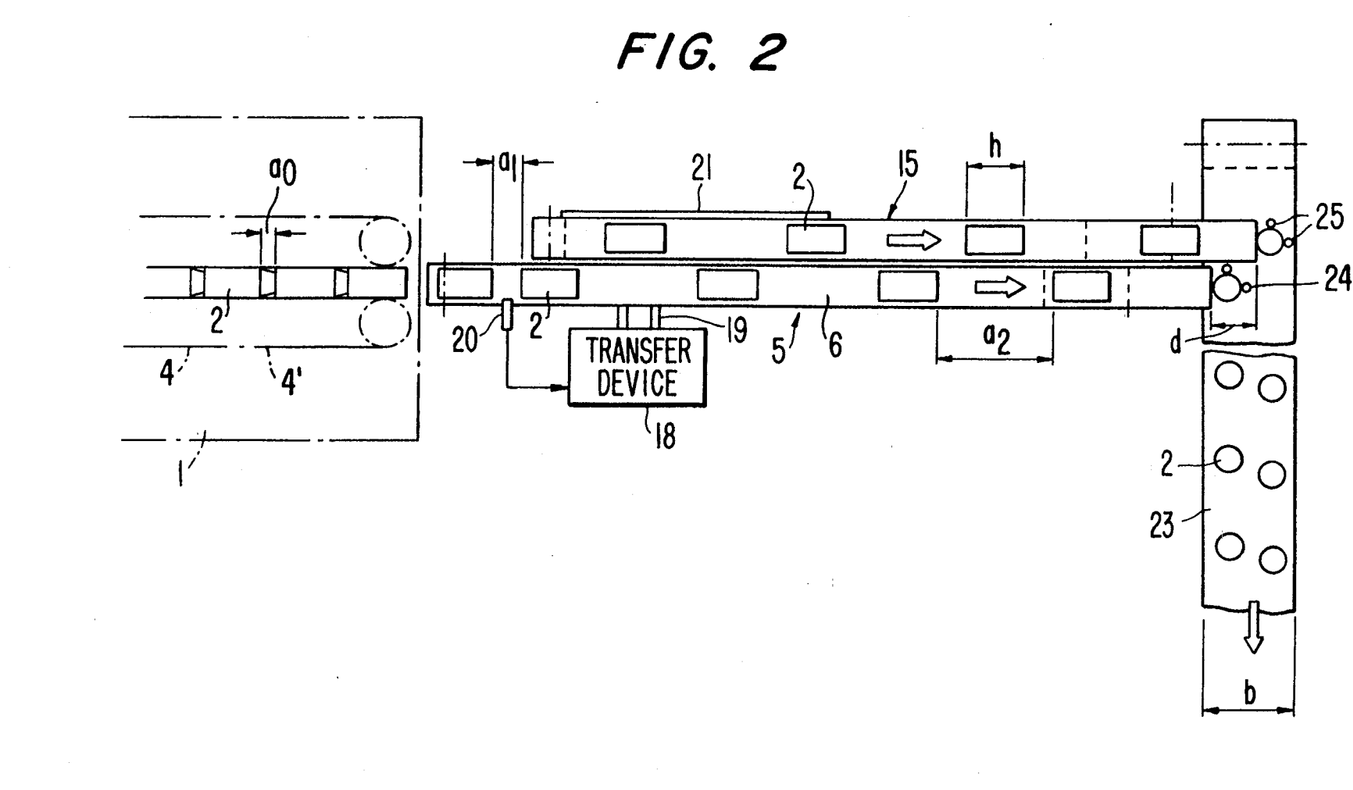
FIG. 2 is a top view of the device shown in FIG. 1.

Referring to FIGS. 1 and 2, there is shown a conveying device according to the invention in which ferromagnetic can bodies 2 (hereinafter referred to as "cans") are discharged horizontally and at a small distance $a_0$ from one another from an upstream unit such as a welding machine 1 or other processing machine. A guide 3 for cans 2 is only symbolically indicated. This type of guide is described in detail, for example in DE-OS (Unexamined Published German Application) No. 3,810,611. Advancement of cans 2, is accomplished, for example, by means of lateral chains 4 having pushers 4'.

A first direction changing band 5 adjoins guide 3. Direction changing band 5 is provided with a belt band 6 which is deflected around two direction changing rolls 7, 8 at each end. In between direction changing rolls 7, 8 belt band 6 is deflected in its direction by 90° by means of a direction changing wheel 9 having a large radius. Belt band 6 has an upper band portion 10 onto which cans 2 are transferred from welding machine 1. Upper band portion 10 has a horizontal region between direction changing roll 7 and direction changing wheel 9 and is vertically aligned at its discharge end 14, which is determined by direction changing roll 8. Upper band portion 10 slides in a known manner on permanent magnets (not separately illustrated), which keep cans 2 pulled to belt band 6. Belt band 6 has a lower belt portion 11 which is guided up and downstream of direction changing wheel 9 by means of further direction changing rolls 12, 13, one of which may be configured as a tensioning roll.

According to the invention, a second direction changing band 15 is arranged parallel to direction changing band 5. Direction changing band 15 has a shorter horizontal region than the adjacent horizontal region of direction changing band 5. Otherwise both direction changing bands 5, 15 are configured in the same manner. In particular, direction changing rolls 8 of both direction changing bands 5 and 15 are arranged at the same height so that the band ends, and their upper band portions, are at the same height.

Direction changing band 15 has a discharge end 16 that is offset in the direction of movement of the horizontally extending regions of upper band portion 10 by a distance d in relation to the discharge end 14 of direction band 5, with the distance d essentially corresponding to the diameter of the largest can for which the conveying unit is designed.

A transfer device 18 which transfers every other one of arriving cans 2 from direction changing band 5 to direction changing band 15 is disposed near the start of direction changing band 15 in the common horizontal region of direction changing bands 5, 15 and on the opposite side of band 5 from band 15. In the simplest case, transfer device 18 has air nozzles 19 that are transversely aligned to direction changing bands 5, 15. In order for the nozzles to discharge air at the appropriate time, an approach switch 20, such as a conventional barrier switch, detects the incoming cans and develops a clock signal which is accordingly divided in half by circuitry not shown for controlling the release of an air stream from nozzles 19 for transferring every other one of the cans.

In order for cans 2 to separate from direction changing band 5, the magnetic support of the aforementioned upper band portion 10 of direction changing band 5 is reduced at the point of transfer of a can from direction changing band 5 to direction changing band 15. In order for the cans not to fall beyond direction changing band 15, the latter is provided with a guide or catchment wall 21 on the side of direction changing band 15 facing away from direction changing band 5. In order to prevent a resilient recoiling of the cans 2, the back of guide 21 may be reinforced.

Preferably, direction changing bands 5 and 15 have a rotational speed that is greater than the advance speed of chain 4. This results in an increased distance between the cans on upright can carrying band 5 to a distance $a_1$. Due to the transfer of every other can to the second direction changing band 15, the originally short distance $a_0$ between the cans increases on each direction changing band to a total of $a_2 = a_1 + h$, with h being the length of the can bodies.

An outgoing upright can carrying band 23 having an upper band portion 22 is arranged at a distance below discharge ends 14 and 16 of direction changing bands 5 and 15, respectively. As viewed from the top in FIG. 2, upright can carrying band 23 is arranged at right angles from direction changing bands 5, 15 and has a width b of approximately 2d, where d is the width of the largest can to be conveyed.

The distance from the discharge ends of the direction changing bands 5, 15 to upright can carrying band 23 is bridged by respective guide baskets 24, 25, into which cans 2 are allowed to fall freely. The height of the openings of guide baskets 24, 25 in the direction toward upright can carrying band 23, corresponds at least to the greatest length of the cans to be positioned.

Each of direction changing bands 5, 15 alternately supplies, by means of guide baskets 24, 25, one can 2 in a standing position to upright can carrying band 23. As with direction changing bands 5, 15, magnets (not shown) are arranged under upper band portion 22 of upright can carrying band 23 and hold cans 2 on upright can carrying band 23 standing on their circular edges.

Due to the offset of direction changing bands 5 and 15 by the aforementioned distance d, cans 2 are transferred and transported in two rows to upright can carrying band 23 and may be combined into one row in any desirable manner, for example by means of lateral guides.

If it is assumed that cans 2 leave welding machine 1 at a speed v1 = 1.67 m/s, direction changing bands 5 and 15 are preferably operated at a higher rotational speed of, for example, v2 = 1.87 . . . 2.33 m/s. Since every other can is transferred to the second direction changing band 15, the distance of the cans on each of direction changing band 5 and 15 changes automatically by at least one can height. In this regard, it is possible for the two direction changing bands 5, 15 to be operated only with the advance speed v1 of the welding machine 1.

The drives for direction changing bands 5 and 15, for example, on direction changing rolls 8, may be brought to turn at the same rate by a suitable motor and synchonizer 8a, resulting in equal rotational speeds for both direction changing bands. Suitable means for this purpose are described, for example, in the BBC Handbook for Electromotors, Essen: Giradet 1968, Pages 344-350.

The speed of the upright can carrying band 23 depends on the required throughput of the cans (cans/min) and the distance between standing cans when entering the next work station or next unit.

In the embodiment according to FIGS. 3 to 6, the can bodies 2 are transferred to a band 31, for example, from the drying path of a welding body maker at the speed v1 and are transferred to an intermediate band 32. Intermediate band 32 runs at the same speed v1. Depending on the function, bands 31 and 32 may be configured to be a single band. The cans have a length h and are positioned on bands 31, 32 at a distance of $a_0$.

Figure 3:
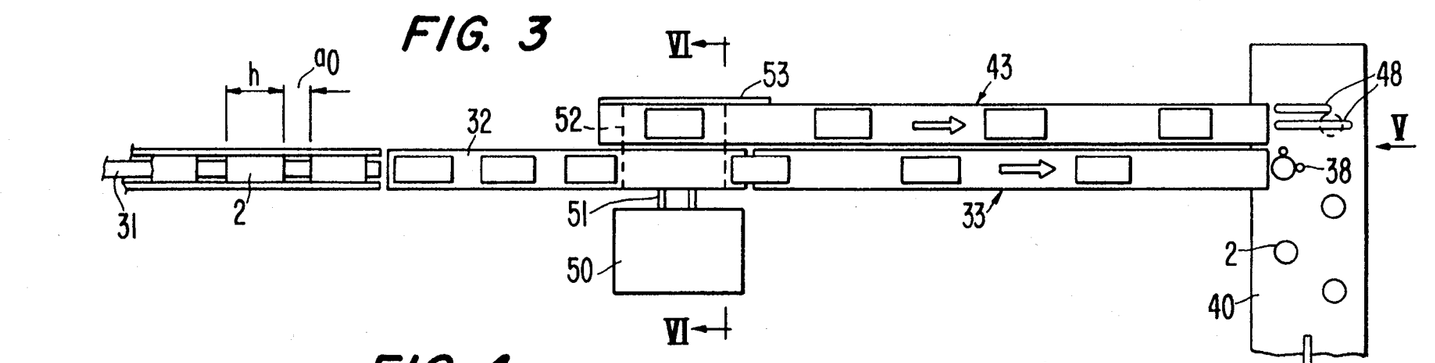
FIG. 3 is a simplified top view of another embodiment of a conveying according to the invention.
Figure 4:
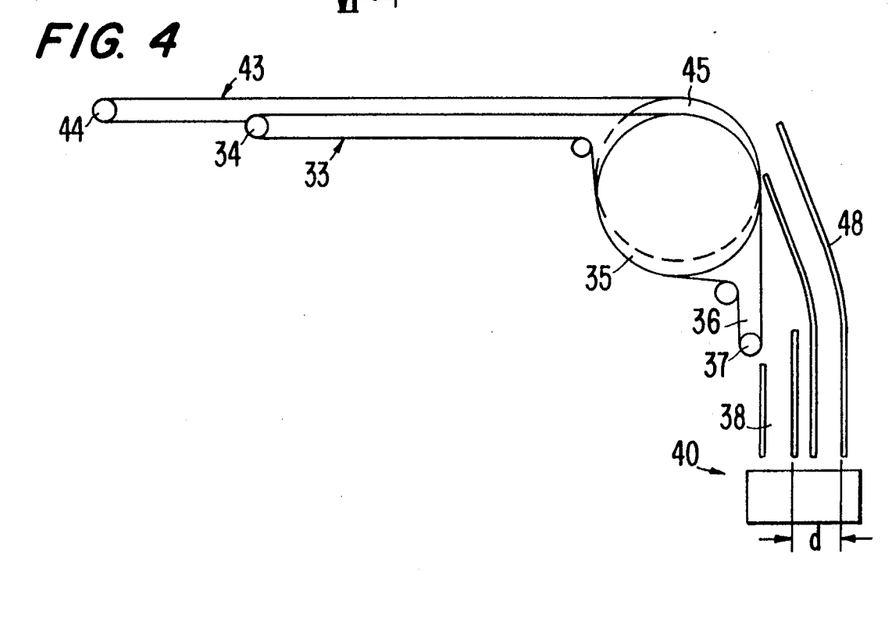
FIG. 4 is side view of a portion of the device shown in FIG. 3 as viewed in direction IV indicated in FIG. 5.
Figure 5:
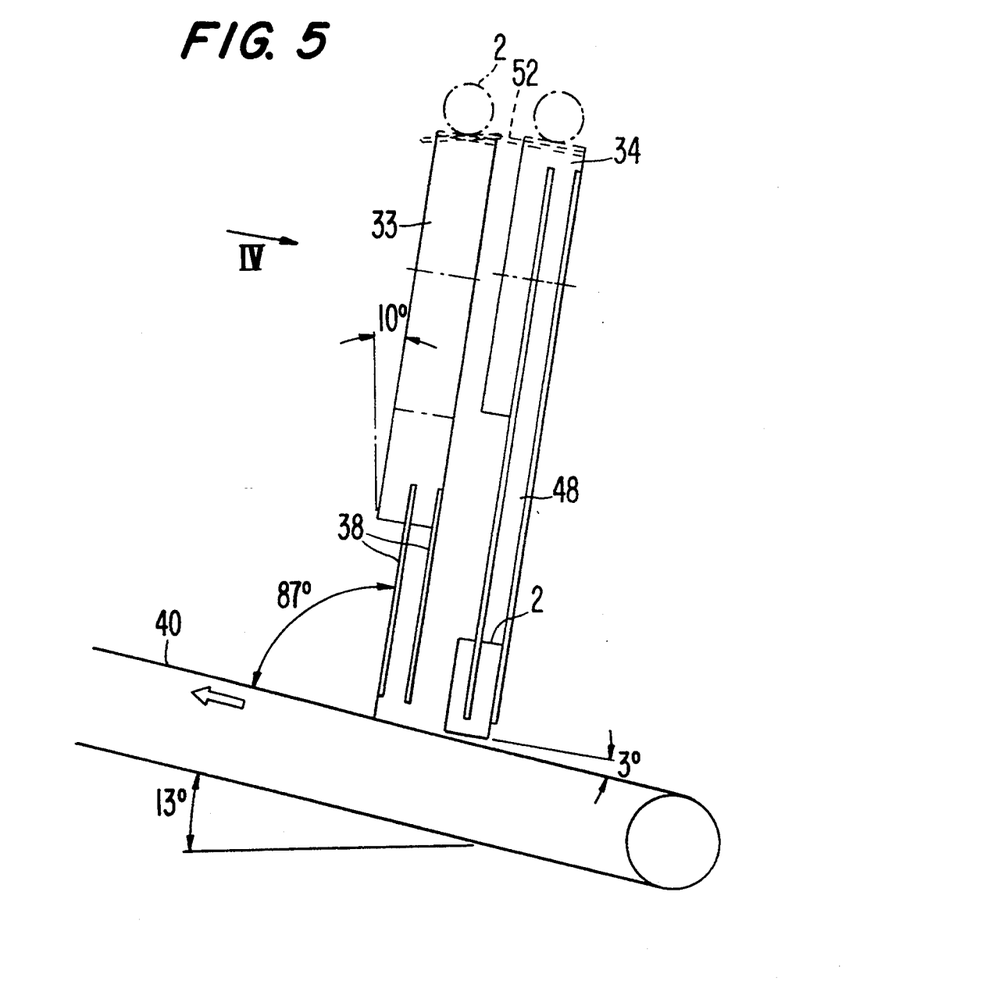
FIG. 5 is an elevational view from the end of the device seen in direction V of FIG. 3.

Directly adjacent the end of intermediate band 32 is a first direction changing band 33. Direction changing band 33 is essentially configured like direction changing band 5 in FIGS. 1 and 2, however, as indicated in FIG. 5, it is inclined at 10° in the direction transverse to the conveying direction. Direction changing band 33 initially takes a horizontal course, which is determined by direction changing roll 34 and direction changing wheel 35 (FIG. 4). Direction changing band 33 has a discharge end 36 which in the side view of FIG. 4 is aligned vertically downward as determined by direction changing wheel 35 and direction changing roll 37. A guide basket 38 abuts discharge end 36 in the same direction. This basket extends to an upright can carrying band 40 and is open for a required height. Although not shown in FIG. 4, guide basket 38 has a center rod (the right-hand rod of guide basket 38 in FIG. 5) that lies downstream, counter to the direction of transport for reasons explained below.

In this embodiment of the invention, a second direction changing band 43 is arranged side-by-side of direction changing band 33, at a small distance therefrom. Direction changing band 43 starts upstream of direction changing band 33, preferably by at least the length of the longest can to be processed, and correspondingly extends along intermediate band 32.

Direction changing band 43 has only a horizontal course, which, with respect to the upper band portion, is determined by direction changing roll 44 and direction changing wheel 45. Direction changing band 43 is not provided with a downward course, but instead is completely reversed by direction changing wheel 45. Removal of cans 2 from direction changing band 43 is accomplished directly by a guide basket 48 adjacent direction changing wheel 45 after an approximate 60° to 85° direction changing from the horizontal line. Guide basket 48 is initially inclined by approximately 5° to 30° toward the vertical line and then changes to a vertical course up to upright can carrying band 40 as shown in the side view of FIG. 4.

The axes of direction changing wheels 35 and 45 are located at the same distance in the original transport direction and both axes are located in a direction transverse of the transport direction of upright can carrying band 40. However, because of the transverse guidance of guide basket 48 as shown from the side in FIG. 4, cans 2 from direction changing band 43 are placed on upright can carrying band 40 at an offset distance d relative to the placement of the cans onto upright can carrying band 40 from direction changing band 33. Offset distance d corresponds at least to the greatest can diameter. As shown in end the elevational view of FIG. 5, guide baskets 38 and 48, and both direction changing bands 33, 43 are inclined at 10°. This incline is not shown in FIG. 3 for purposes of simplification of illustration. Upright can carrying band 40 is provided with an incline of 13° in relation to the horizontal in order to compensate for the loss of height resulting from direction changing bands 33, 43 and guide baskets 38, 48.

In general, the inclination with respect to the vertical of the direction of discharge, as determined by guide baskets 38, 48, and inclination of the receiving portion of band 40 relative to the horizontal is preferably in a range from about 5° to about 45° and more preferably in the range from about 8° to about 18°.

The angle of incline of upright can carrying band 40 is shown as 3° greater than the transverse incline of direction changing bands 33, 43 and guide baskets 38, 48. This angular difference may preferably fall within the range of about 1° to about 10° and more preferably within the range of about 2° to about 5° so that the angle between the direction of discharge and the receiving portion of band 40 is preferably between about 80° and about 89° and more preferably between about 85° and 88°. The reason for this is that, when viewed in the transport direction of upright can carrying band 40, the forward edge of a respective can body 2 impacts upright can carrying band 40 thus ensuring a secure advancement of the can. An inadvertent further tipping of the can toward the back is prevented by the rearward guide rods of guide baskets 38 and 48 as shown in FIG. 5.

Figure 6:
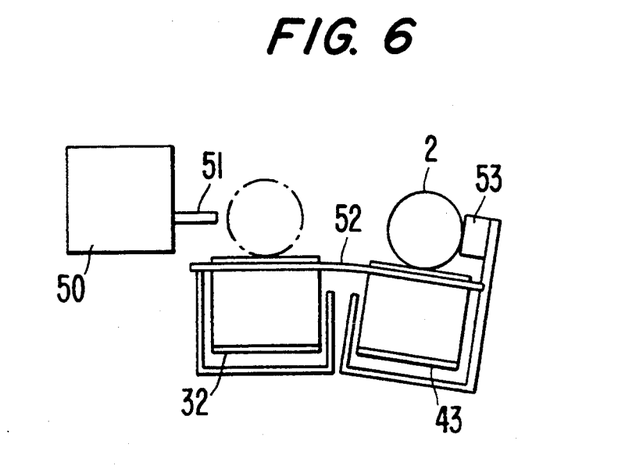
FIG. 6 a cross section of the device along line VI—VI in FIG. 3.

As already explained, the second direction changing band 43 extends in a common region along intermediated band 32 by a distance of at least the greatest can length. As shown in FIGS. 3 and 6, a transfer device 50 for transferring can bodies from intermediate band 32 to direction changing band 43 is located in the common region of bands 32 and 43. Device 50, similarly to device 18 of the embodiment of FIGS. 1 and 2, is provided with air nozzles 51 and the control of the device may be accomplished analogously.

For a smooth arrival of the cans 2 on the horizontal portion of direction changing band 43, a metal transfer plate 52 (see also FIG. 6) is arranged below and between the upper band portion of bands 32 and 43, respectively. Direction changing band 43 is again provided with a catchment wall or guide 53 for the cans.

In this latter embodiment there is a separation of the cans at the beginning onto the two direction changing bands 33, 43, which ensures an increase in the distance between the cans to be transported. Thus, direction changing bands 33, 43 each accommodates only a portion of the arriving cans, so that these direction changing bands may be operated with greater, equal or even lower speed with respect to the intermediate bands 32 and band 31, depending on specific requirements.

The invention has been described in detail with respect to preferred embodiments, and it will now be apparent from the foregoing to those skilled in the art that changes and modifications may be made without departing from the invention and its boarder aspects, and the invention, therefore, in the appended claims to cover all such changes and modifications as fall within the true spirit of the invention.

What is claimed is:

1. A conveying device for vertically positioning ferromagnetic cans discharged in a horizontal position from a unit upstream of the conveying device, comprising:

a first direction changing band for receiving and transporting horizontally disposed ferromagnetic cans discharged from the upstream unit and having a first discharge end for discharging cans in an essentially vertical orientation;

a second direction changing band disposed along side said first direction changing band for receiving and transporting horizontally disposed ferromagnetic cans and having a second discharge end for discharging cans in an essentially vertical orientation;

a transfer device located for transferring a portion of the horizontally disposed ferromagnetic cans discharged from the upstream unit to said second direction changing band so that said first direction changing band transports a remaining portion of the ferromagnetic cans; and an upright can carrying band disposed beneath the first and second discharge ends of said first and second direction changing bands for receiving the essentially vertically oriented cans;

wherein said upright can carrying band, from a top view, has a conveying direction which is substantially at a right angle to a conveying direction of said direction changing bands and the discharge ends of said direction changing bands are offset in a direction transverse to the conveying direction of said upright can carrying band.

2. A conveying device according to claim 1, wherein said transfer device includes air nozzles arranged transversely of the direction in which the cans are transported for transferring the cans to said second direction changing band.

3. A conveying device according to claim 1, wherein said transfer device includes a press which is movable transversely of the direction in which the cans are transported for transferring the cans to said second direction changing band.

4. A conveying device according to claim 1, and further including a switch located upstream of said transfer device for sensing cans and producing a signal for controlling said transfer device.

5. A conveying device according to claim 1, and further comprising a limitation guide arranged on a side of said second direction changing band facing away from said transfer device for limiting displacement of the cans when transferred to said second direction changing band.

6. A conveying device according to claim 1, and further comprising first and second drive mechanisms for driving said first and second direction changing bands and means for synchronizing said first and second drive mechanisms.

7. A conveying device for vertically positioning ferromagnetic cans discharged in a horizontal position from a unit upstream of the conveying device, comprising:
- a first direction changing band for receiving and transporting horizontally disposed ferromagnetic cans discharged from the upstream unit and having a first discharge end for discharging cans in an essentially vertical orientation;
- a second direction changing band disposed along side said first direction changing band for receiving and transporting horizontally disposed ferromagnetic cans and having a second discharge end for discharging cans in an essentially vertical orientation;
- said first and second direction changing bands each including an upper band portion and a magnetic support on which the upper band portion slides for keeping the cans pulled to the respective upper band portion;
- a transfer device located for transferring a portion of the horizontally disposed ferromagnetic cans from the first direction changing band to said second direction changing band so that said first direction changing band transports a remaining portion of the ferromagnetic cans received from the upstream unit, wherein the magnetic support of said first band is reduced in a region adjacent said transfer device to allow a can to be transferred from said first direction changing band to said second direction changing band; and
- an upright can carrying band disposed beneath the first and second discharge ends of said first and second direction changing bands for receiving the essentially vertically oriented cans.

8. A conveying device according to claim 7, and further comprising a metal transfer plate extending below and between the upper band portions of said first and second direction changing bands in the region adjacent said transfer device.

9. A conveying device for vertically positioning ferromagnetic cans discharged in a horizontal position from a unit upstream of the conveying device, the upstream unit including a conveying belt having an upper belt portion which transports cans away from the upstream unit, said conveying device comprising:
- a first direction changing band for receiving and transporting horizontally disposed ferromagnetic cans discharged from the upstream unit and having a first discharge end for discharging cans in an essentially vertical orientation;
- a second direction changing band disposed along side said first direction changing band and having an upper band portion for receiving and transporting horizontally disposed ferromagnetic cans and having a second discharge end for discharging cans in an essentially vertical orientation;
- a transfer device located for transferring a portion of the horizontally disposed ferromagnetic cans discharged from the upstream unit to said second direction changing band so that said first direction changing band transports a remaining portion of the ferromagnetic cans, said second direction changing band extending in a region of said transfer device parallel to the conveying belt of the upstream unit by a distance which corresponds at least to the greatest length of a can to be conveyed by said conveying device so that cans can be transferred by said transfer device from the conveying belt of the upstream unit to said second direction changing band;
- a metal transfer plate extending below and between the upper belt portion and said upper band portion in the region of said transfer device; and
- an upright can carrying band disposed beneath the first and second discharge ends of said first and second direction changing bands for receiving the essentially vertically oriented cans.

10. A conveying device for vertically positioning ferromagnetic cans discharged in a horizontal position from a unit upstream of the conveying device, comprising:
- a first direction changing band for receiving and transporting horizontally disposed ferromagnetic cans discharged from the upstream unit and having a first discharge end for discharging cans in an essentially vertical orientation;
- a second direction changing band disposed along side said first direction changing band for receiving and transporting horizontally disposed ferromagnetic cans and having a second discharge end for discharging cans in an essentially vertical orientation;
- said first and second direction changing bands being arranged for discharging the cans at the respective first and second discharge ends at a first angle in a range from about 5° to about 45° relative to a vertical line;
- a transfer device located for transferring a portion of the horizontally disposed ferromagnetic cans discharged from the upstream unit to said second direction changing band so that said first direction changing band transports a remaining portion of the ferromagnetic cans; and
- an upright can carrying band disposed beneath the first and second discharge ends of said first and second direction changing bands for receiving the essentially vertically oriented cans; said upright can carrying band having a receiving portion for receiving cans from said direction changing bands which is at a second angle in a range from about 5° to about 45° relative to a horizontal line.

11. A conveying device according to claim 10, wherein the first angle is in a range from about 8° to about 18°.

12. A conveying device according claim 10, wherein the second angle is in a range from about 8° to about 18°.

13. A conveying device for vertically positioning ferromagnetic cans discharged in a horizontal position from a unit upstream of the conveying device, comprising:
- a first direction changing band for receiving and transporting horizontally disposed ferromagnetic cans discharged from the upstream unit and having a first discharge end for discharging cans in an essentially vertical orientation;
- a second direction changing band disposed along side said first direction changing band for receiving and transporting horizontally disposed ferromagnetic cans and having a second discharge end for discharging cans in an essentially vertical orientation;
- a transfer device located for transferring a portion of the horizontally disposed ferromagnetic cans discharged from the upstream unit to said second direction changing band so that said first direction changing band transports a remaining portion of the ferromagnetic cans; and an upright can carrying band disposed beneath the first and second discharge ends of said first and second direction changing bands for receiving the essentially vertically oriented cans;

wherein said first and second direction changing bands are arranged to discharge the cans in a given direction and said upright can carrying band has a receiving portion adjacent the discharge ends of said first and second direction changing bands which forms an angle with the given direction in which the cans are discharged in a range from about 80° to about 89°.

14. A conveying device according to claim 13, wherein the angle is in the range from about 85° to about 88°.

* * * * *